United States Patent
Na (10) Patent No.: US 6,545,715 B1
(45) Date of Patent: Apr. 8, 2003

(54) APPARATUS AND METHOD FOR CONTROLLING FOCUS USING ADAPTIVE FILTER

(75) Inventor: Woon Na, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/082,353

(22) Filed: May 20, 1998

(30) Foreign Application Priority Data

May 21, 1997 (KR) .......................................... 97-19857

(51) Int. Cl.⁷ .............................................. H04N 5/232
(52) U.S. Cl. ........................ 348/351; 348/252; 348/354; 382/263
(58) Field of Search ............................... 348/207, 222, 348/335, 340, 342, 345, 349, 350, 351, 353–356, 207.99, 222.1, 223.1, 224.1, 252, 253; 396/79, 81, 82, 96, 125, 126, 128; 382/254, 260, 261, 263, 264, 266, 270; G03B 13/00

(56) References Cited

U.S. PATENT DOCUMENTS

| | | | | |
|---|---|---|---|---|
| 5,128,706 A | * | 7/1992 | Shindo | 396/101 |
| 5,233,431 A | * | 8/1993 | Yoshida | 348/342 |
| 5,291,564 A | * | 3/1994 | Shah | 382/291 |
| 5,915,047 A | * | 6/1999 | Muramoto | 348/335 |
| 6,111,608 A | * | 8/2000 | Koizumi | 348/342 |

OTHER PUBLICATIONS

Jarvis, R.A., "Focus Optimisation Criteria for Computer Image Processing," Microscope Magazine, 1976, pp. 166.

Nayar, Shree K., Nakagawa, Yasuo, "Shape from Focus," IEEE Transactions on Pattern Analysis and Machine Intelligence, vol. 16, No. 8, p. 827.

* cited by examiner

Primary Examiner—Ngoc-Yen Vu
(74) Attorney, Agent, or Firm—Mills & Onello LLP

(57) ABSTRACT

An apparatus and method for controlling focus using an adaptive filter are provided. The apparatus includes an adaptive low-pass filter for covering an image signal captured through the lens with a mask of a predetermined size, comparing brightness level differences between a central pixel located in the center of the mask and pixels adjacent to the central pixel with a threshold value, multiplying a weight calculated in response to the comparison result by the brightness level of a concerned pixel in the mask, adding together the multiplication results of all the pixels, and outputting the addition result as an adaptively low-pass filtered image signal. A high-pass filter filters a high-frequency component of the adaptively low-pass filtered image signal. An absolute value calculator calculates the absolute values of the image signal in which the high-frequency component is filtered, and an accumulator accumulates the absolute values and outputs the accumulated value as the focus value of the captured image signal.

14 Claims, 8 Drawing Sheets

APPARATUS AND METHOD FOR CONTROLLING FOCUS USING ADAPTIVE FILTER

BACKGROUND OF THE INVENTION

1. Field of the Invention

The present invention relates to an application of an adaptive band-pass or low-pass filter, and more particularly, to an apparatus and method for controlling focus using an adaptive filter in, for example, a camcorder.

2. Description of Related Art

In general, an automatic focus control method used for an electronic zoom system of a digital video camera or a camcorder is either an active type or a passive type. In an active automatic focus control method, focus is controlled by calculating the distance between the lens and the subject using an infrared or ultrasonic wave reflected from the subject. In a passive automatic focus control method, focus is adjusted based on the image signal received through the lens.

In the passive automatic focus control method, an image received through the lens is modeled as an image which has passed through a Gaussian low-pass filter. A summation of high-frequency components such as the edge of the modeled image is used as a reference for determining the focus. The image having the largest focus value is defined as the image having the best adjusted focus. However, an unexpected result can be caused by noise in the image obtained under various circumstances. Namely, noise having a high-frequency component affects the focus value for controlling the focus. It would be desirable to reduce the noise having high-frequency components in the low-frequency area of the image, while preserving the high-frequency components such as the edge.

Figure 1:
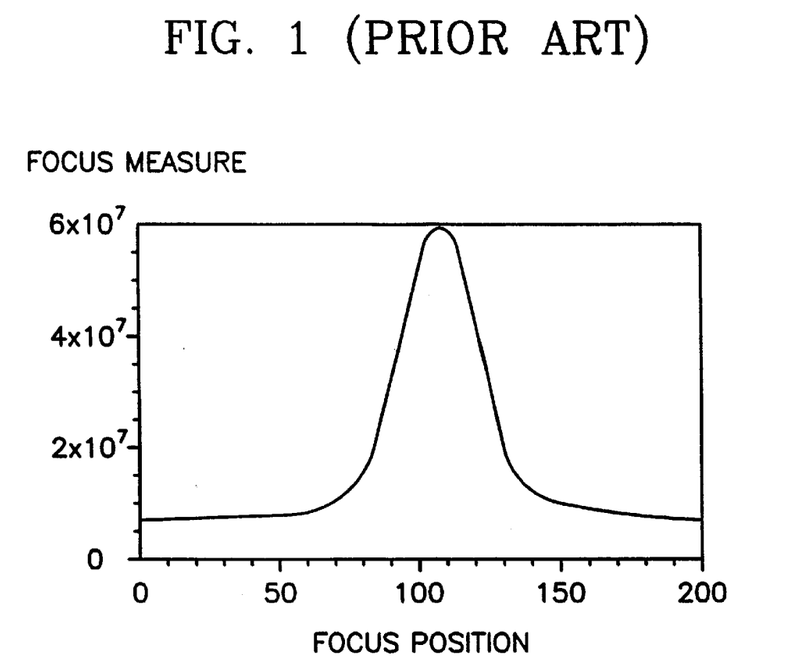
FIG. 1 contains a focus curve of a conventional sum modified Laplacian (SML) passive automatic focus control method.
Figure 2:
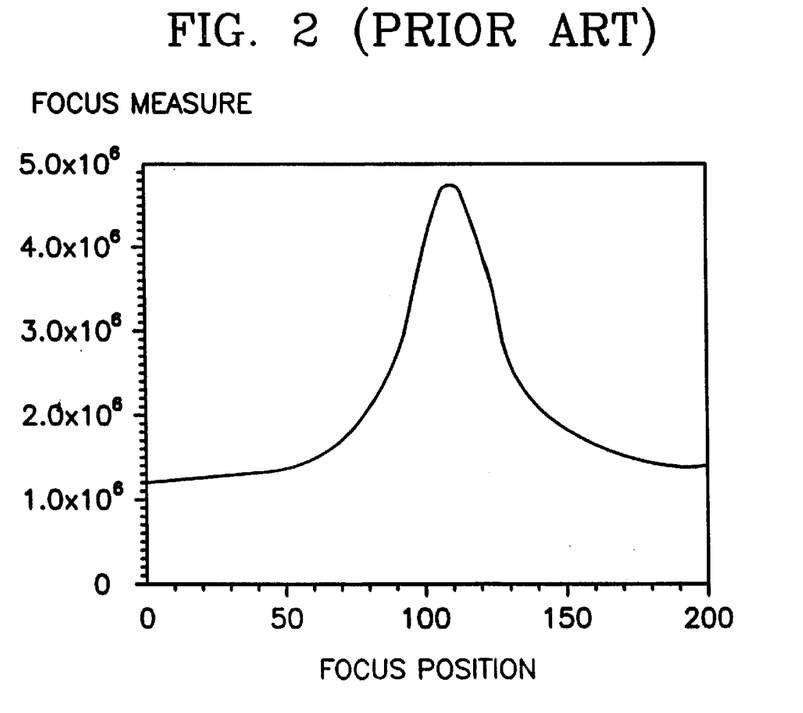
FIG. 2 contains a focus curve of a conventional sum modules difference (SMD) passive automatic focus control method.

FIGS. 1 and 2 contain focus curves, i.e., plots of focus measure versus focus position, for two conventional passive automatic focus control methods. FIG. 1 shows a focus curve obtained by a sum modified Laplacian (SML) method. FIG. 2 shows a focus curve obtained by a sum modulus difference (SMD) method.

An SML method entitled "Shape from Focus," mentioned at page 827 of IEEE Transactions on Pattern Analysis and Machine Intelligence, VOL. 16, No. 8, published on August 1994 by Shree K. Nayar and Yasuo Nakagawa, is a conventional passive automatic focus controlling method. In the SML method, an absolute value of a secondary differential value of a horizontal and vertical direction by using reformed Laplacian filter is used as a focus value. Accordingly, the SML method has the characteristics shown in FIG. 1.

A sum modulus difference (SMD) method entitled "Focus Optimisation Criteria for Computer Image Processing," mentioned at page 166 of "Microscope" magazine published in 1976 by R. A. Jarvis, is another conventional passive automatic focus control method. In this method, differences between horizontally and vertically adjacent pixel values of an image are obtained and accumulated. The accumulated results in thy respective directions are added. The added value is used as the focus value. Accordingly, the method has the characteristic shown in FIG. 2.

Focus curves such as those shown in FIGS. 1 and 2 can be used to evaluate performance of automatic focus control methods. In analyzing such curves, it is typically noted whether a focus curve has a slope over the entire range of focus positions and whether the slope of the focus curve is steep near the maximum focus measure.

Also, the slope of the focus curve must not change from positive (+) to negative (−) or from negative (−) to positive (+) in focus positions other than the focus position of the maximum focus measure. That is, it is desirable that no local maximum focus measure, i.e., change of slope sign, exists. However, in the above-mentioned passive automatic focus control methods, local maxima can exist because the characteristics of each image vary due to noise and, as a result, ideal images are not input.

Also, these conventional passive automatic focus control methods require extensive processing memory. For example, at least three line memories are required as hardware for the above-mentioned SML method. Also, at least one line memory is required for the SMD method.

SUMMARY OF THE INVENTION

It is an object of the present invention to provide a focus control apparatus using an adaptive filter, for accurately providing a focus value required for controlling the focus by reducing high-frequency noise in a low-frequency component of an image, while preserving and enhancing an edge or a detailed portion of the image. In one aspect of the invention, the adaptive filter is an adaptive band-pass filter or an adaptive low-pass filter.

It is another object of the present invention to provide a focus control method performed by the focus control apparatus, using an adaptive filter.

Accordingly, the present invention provides a focus control apparatus using an adaptive filter for determining a focus value used for controlling the focus of a lens. In one embodiment, the apparatus of the invention comprises adaptive low-pass filtering means for covering an image signal captured through the lens with a mask of a predetermined size. The adaptive low-pass filtering means compares brightness level differences between a central pixel located in the center of the mask and pixels adjacent to the central pixel with a threshold value, multiplies a weight calculated in response to the comparison result by the brightness level of a concerned pixel in the mask. The adaptive low-pass filtering means adds together the multiplication results of all the pixels, and outputs the sum as an adaptively low-pass filtered image signal. The apparatus of the invention also includes a high-pass filter for filtering a high-frequency component of the adaptively low-pass filtered image signal, absolute value calculating means for calculating the absolute values of the image signal in which the high-frequency component is filtered, and accumulating means for accumulating the absolute values and outputting the accumulated value as the focus value of the captured image signal.

In another embodiment, a focus control apparatus in accordance with the invention using an adaptive filter for determining a focus value used for controlling the focus of a lens comprises adaptive band-pass filtering means for covering an image signal captured through the lens with a mask of a predetermined size. The adaptive band-pass filtering means compares brightness level differences between a central pixel located in the center of the mask and pixels adjacent to the central pixel with first, second, and third threshold values. It multiplies the sum of first and second weights, calculated in response to the comparison results, by the brightness level of a concerned pixel in the mask. The multiplication results for all the pixels are added, and the resulting sum is output as an adaptively band-pass filtered image signal. The apparatus of the invention also includes a high-pass filter for filtering the high-frequency component of the adaptively band-pass filtered image signal, absolute value calculating means for calculating the absolute values of the image signal in which the high-frequency component is filtered, and accumulating means for accumulating the absolute values and outputting the accumulated value as the focus value of the captured image signal.

In one embodiment, the focus control method of the invention, using an adaptive filter for determining a focus value used to control the focus of a lens, comprises the steps of (a) obtaining an adaptively low-pass filtered image signal by sequentially covering the image signal captured through the lens with a mask of a predetermined size, comparing brightness level differences between a central pixel located in the center of the mask and pixels adjacent to the central pixel with a threshold value, multiplying a weight calculated corresponding to the comparison result by the brightness level of a concerned pixel in the mask, and adding the multiplication results for all pixels, (b) filtering the high-frequency component of the adaptively low-pass filtered image signal, (c) obtaining the absolute values of the image signal in which the high-frequency component is filtered, and (d) determining the focus value of the captured image signal by accumulating the absolute values.

In another embodiment, the focus controlling method of the invention using an adaptive filter for determining a focus value used to control the focus of a lens, comprises the steps of (a) sequentially covering the image signal captured through the lens with a mask of a predetermined size, comparing brightness level differences between a central pixel located in the center of the mask and pixels adjacent to the central pixel with first, second, and third threshold values, multiplying the sum of first and second weights calculated according to the comparison results by the brightness level of the concerned pixel, and obtaining an adaptively band-pass filtered image signal by accumulating the multiplication results, (b) filtering the high-frequency component of the adaptively band-pass filtered image signal, (c) obtaining the absolute value of the image signal in which the high-frequency component is filtered, and (d) determining the focus value of the captured image signal by accumulating the absolute values.

BRIEF DESCRIPTION OF THE DRAWING(S)

The above objectives and advantages of the present invention will become more apparent by describing in detail a preferred embodiment thereof with reference to the attached drawings in which.

DETAILED DESCRIPTION OF PREFERRED EMBODIMENTS OF THE INVENTION

Hereinafter, the structure and operation of a focus control apparatus using an adaptive filter, according to the present invention, and a method therefor, will be described with reference to the attached drawings.

Figure 3:
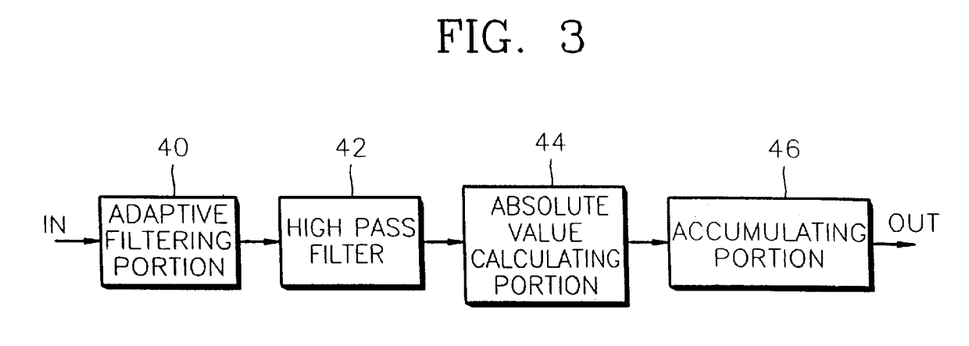
FIG. 3 is a schematic block diagram of one embodiment of a focus control apparatus using an adaptive filter according to the present invention.

In one embodiment, the focus control apparatus using an adaptive filter according to the present invention, shown in the block diagram of FIG. 3, includes an adaptive filtering portion 40, a high-pass filter 42, an absolute value calculating portion 44, and an accumulating portion 46.

Figure 4:
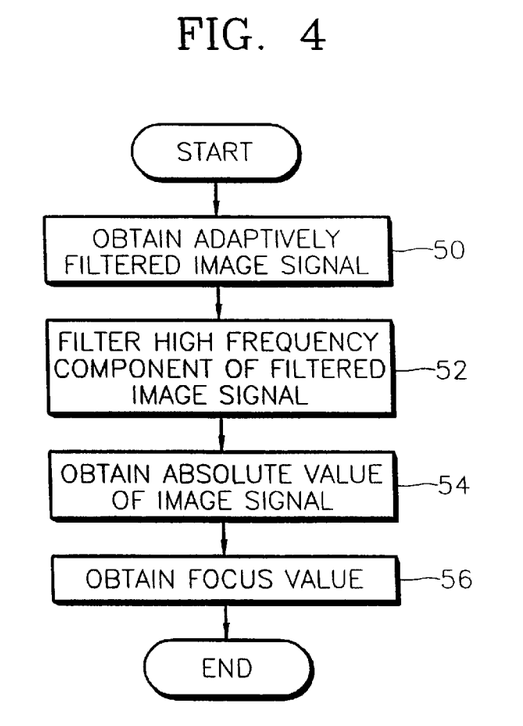
FIG. 4 is a flow chart describing one embodiment of a focus control method which can be performed in the apparatus shown in FIG. 3 according to the present invention.

The focus control method shown in FIG. 4 includes the steps of high-pass filtering an adaptively filtered image signal and obtaining the absolute value of the filtered image signal (steps 50 through 54) and of obtaining the focus value by accumulating the absolute values (step 56).

The adaptive filtering portion 40 shown in FIG. 3 generates the adaptively filtered image signal from image signal input through an input terminal IN (step 50). Here, the adaptive filtering portion 40 can be implemented as an adaptive band-pass filter or an adaptive low-pass filter.

The adaptive low-pass filter uses a correlation between adjacent pixels. A mask of dimension M×N pixels overlays or covers the pixels of the image and defines a central pixel at the center of the mask and pixels adjacent to the central pixel. When a brightness level difference between the central pixel and the adjacent pixels is less than or equal to a preselected threshold value TV1, the adaptive low-pass filter obtains a new value by varying a weight according to the brightness level difference between the pixels. An adaptive edge enhancer also uses a correlation between adjacent pixels.

When a brightness level difference between the central pixel and adjacent pixels is greater than or equal to a second preselected threshold value TV2 and less than or equal to a third threshold value TV3, the adaptive aperture filter obtains a new value by varying a weight according to the brightness level difference between the pixels. Here, the adaptive band-pass filter, including the above-mentioned adaptive low-pass filter and the adaptive edge enhancer, obtains the band-pass filtered result by adding the adaptively low-pass filtered result to the adaptively aperature edge enhanced result.

Figure 5:
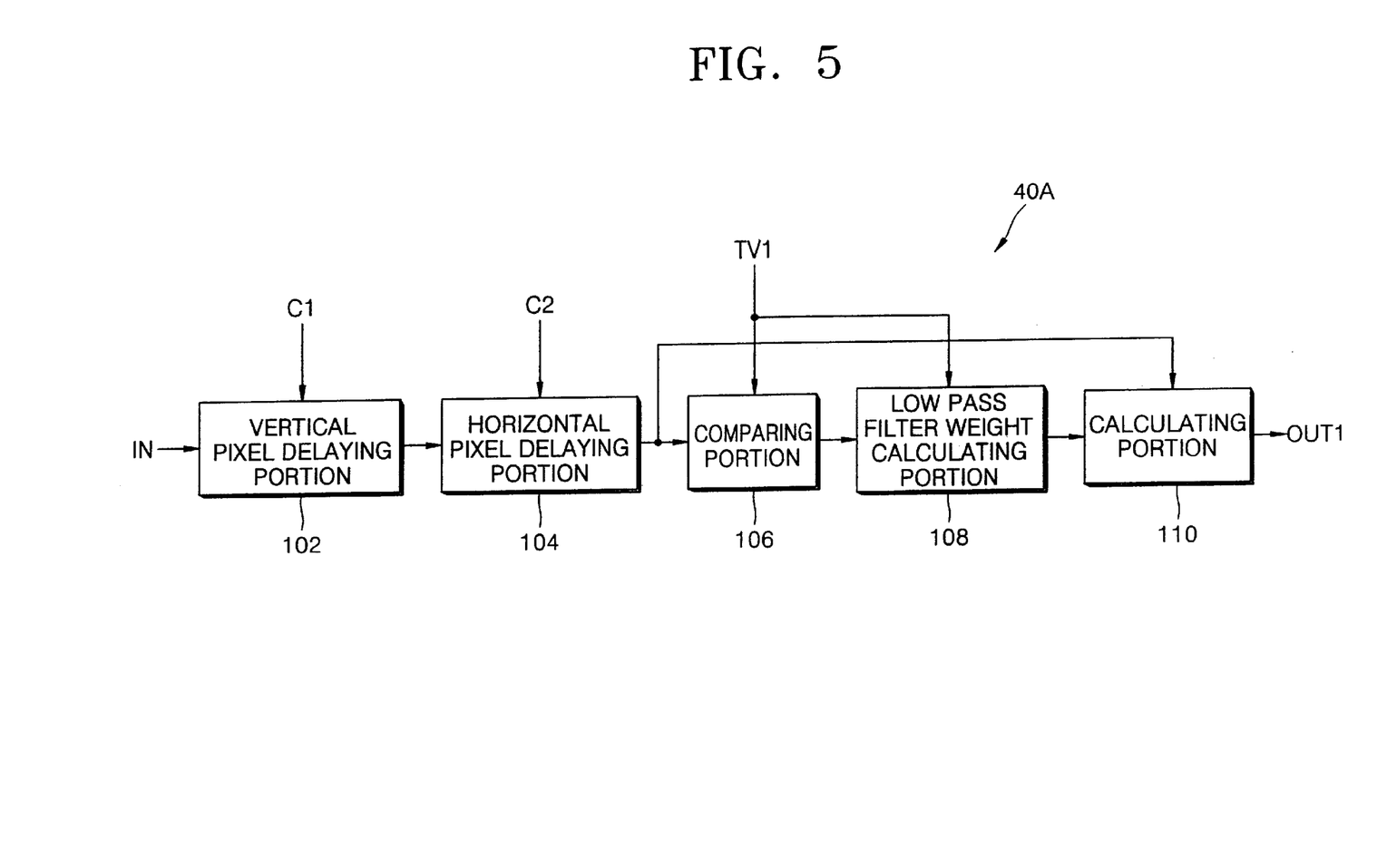
FIG. 5 is a block diagram of one embodiment of an adaptive low-pass filter according to the present invention.

FIG. 5 is a block diagram of an adaptive low-pass filter 40A according to the present invention, corresponding to the adaptive filtering portion 40 shown in FIG. 3. The adaptive low-pass filter 40A includes a vertical pixel delaying portion 102, a horizontal pixel delaying portion 104, a comparing portion 106, a low-pass filter weight calculating portion 108, and a calculating portion 110.

Figure 6:
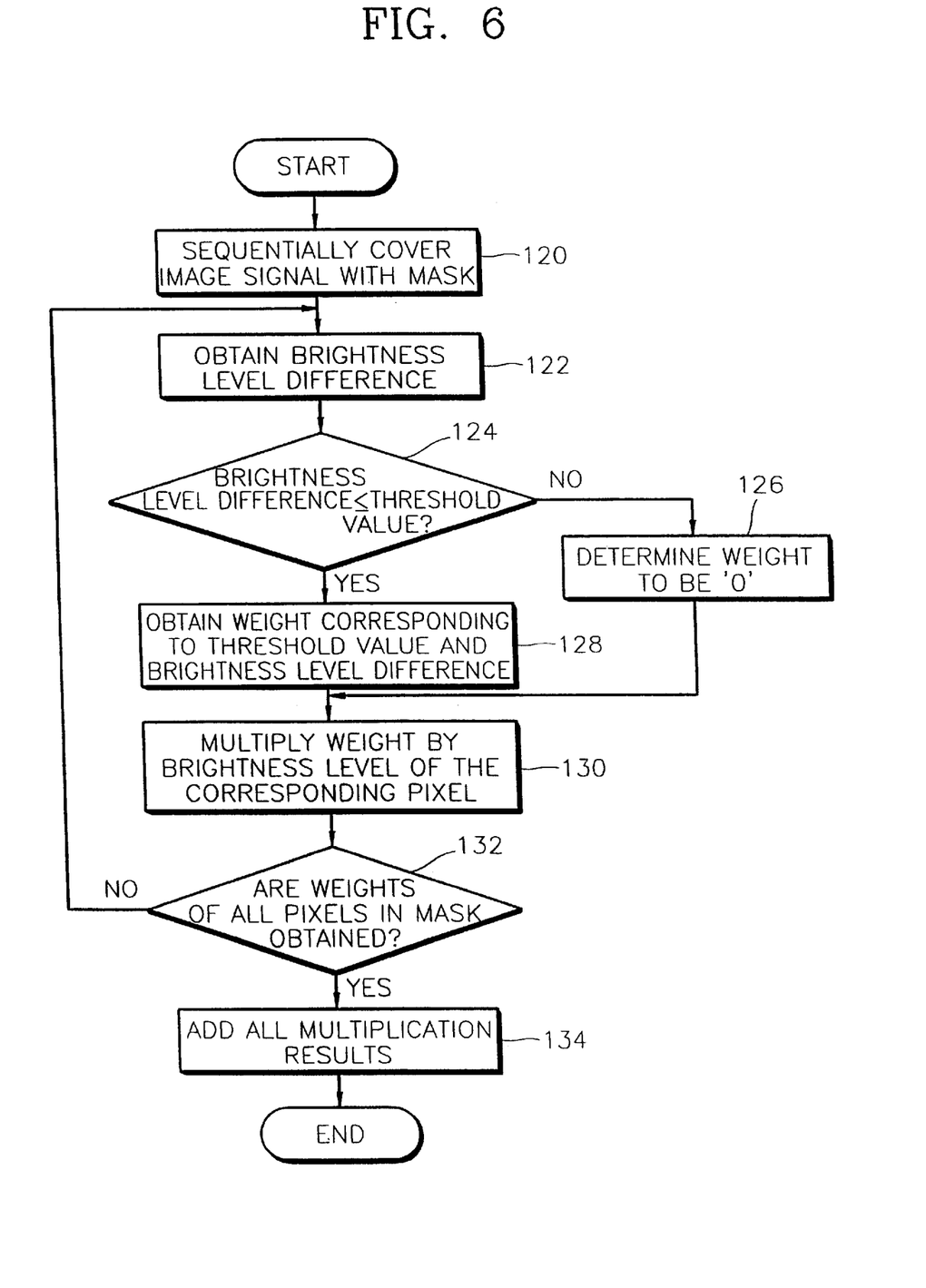
FIG. 6 is a flow chart describing one embodiment of a method for adaptively low-pass filtering an image signal which can be used by the apparatus shown in FIG. 5 according to the present invention.

FIG. 6 is a flow chart describing a method for adaptively low-pass filtering an image signal using the apparatus shown in FIG. 5. The method includes the steps of obtaining the weight (steps 120 through 128) and the steps of obtaining the adaptively low-pass filtered image signal by multiplying the weight by the brightness level of a pixel (steps 130 through 134).

First, the adaptive low pass filter 40A shown in FIG. 5 sequentially covers with the mask the image signal captured through a lens (not shown) and input through an input terminal IN (step 120). The vertical pixel delaying portion 102 vertically delays the image signal, in response to a first control signal (C1), and outputs the vertically delayed image signal. The vertical pixel delaying portion 102 can be realized using a line memory. The horizontal pixel delaying portion 104 horizontally delays the output of the vertical pixel delaying portion 102 in response to a second control signal C2 and outputs the horizontally delayed signal to a comparing portion 106. The above-mentioned first and second control signals C1 and C2 are output from a controlling portion (not shown) which will be referred to hereinafter.

After step 120, the comparing portion 106 calculates a brightness level difference between a central pixel and each pixel adjacent to the central pixel among the brightness levels of the pixels output from the horizontal pixel delaying portion 104 (step 122). After the step 122, the comparing portion 106 determines whether the calculated brightness level difference is less than or equal to the threshold value TV1 (step 124). If the brightness level difference is larger than the threshold value TV1, the low-pass filter weight calculating portion 108 determines the weight to be '0' (step 126). However, if the brightness level difference is less than or equal to the threshold value TV1, the low-pass filter weight calculating portion 108 calculates the weight $W_1(m, n)$ of a pixel as shown in the following equation 1, corresponding to the brightness level difference output from the comparing portion 106 and the threshold value TV1 input from the outside (step 128).

$$W_1(m, n) = 1 - \frac{|x(i, j) - x(i+k, j+1)|}{TV1}; \quad (1)$$
$$\text{for } -\frac{M}{2} \leq k \leq \frac{M}{2} \text{ and } -\frac{N}{2} \leq l \leq \frac{N}{2}$$

wherein, $W_1(m,n)$, $x(i,j)$, $x(i+k,j+1)$, M, and N respectively represent the weight, the brightness level of the central pixel, the brightness level of an adjacent pixel, the row of the mask, and the column of the mask. When the size of the image is X×Y (rows×columns), $0 \leq i \leq X$ and $0 \leq j \leq Y$.

After step 128, the calculating portion 110 multiplies the weight by the brightness levels of the respective pixels of the image signal output from the horizontal pixel delaying portion 104 (step 130). After step 130, the controlling portion (not shown) determines whether the weights of all the pixels in the mask are obtained (step 132). When the weights of all the pixels are not obtained, the controlling portion (not shown) outputs the first and second control signals (C1 and C2) so that the brightness level of a concerned pixel whose weight will be obtained is input to the comparing portion 106 and allows the comparing portion 106 to obtain the brightness level difference (step 122). However, when the weights of all the pixels in the mask are obtained, the calculating portion 110 adds the multiplied values to each other and outputs the added values through an output terminal OUT1 as the adaptively low-pass filtered image signal (step 134).

Figure 7:
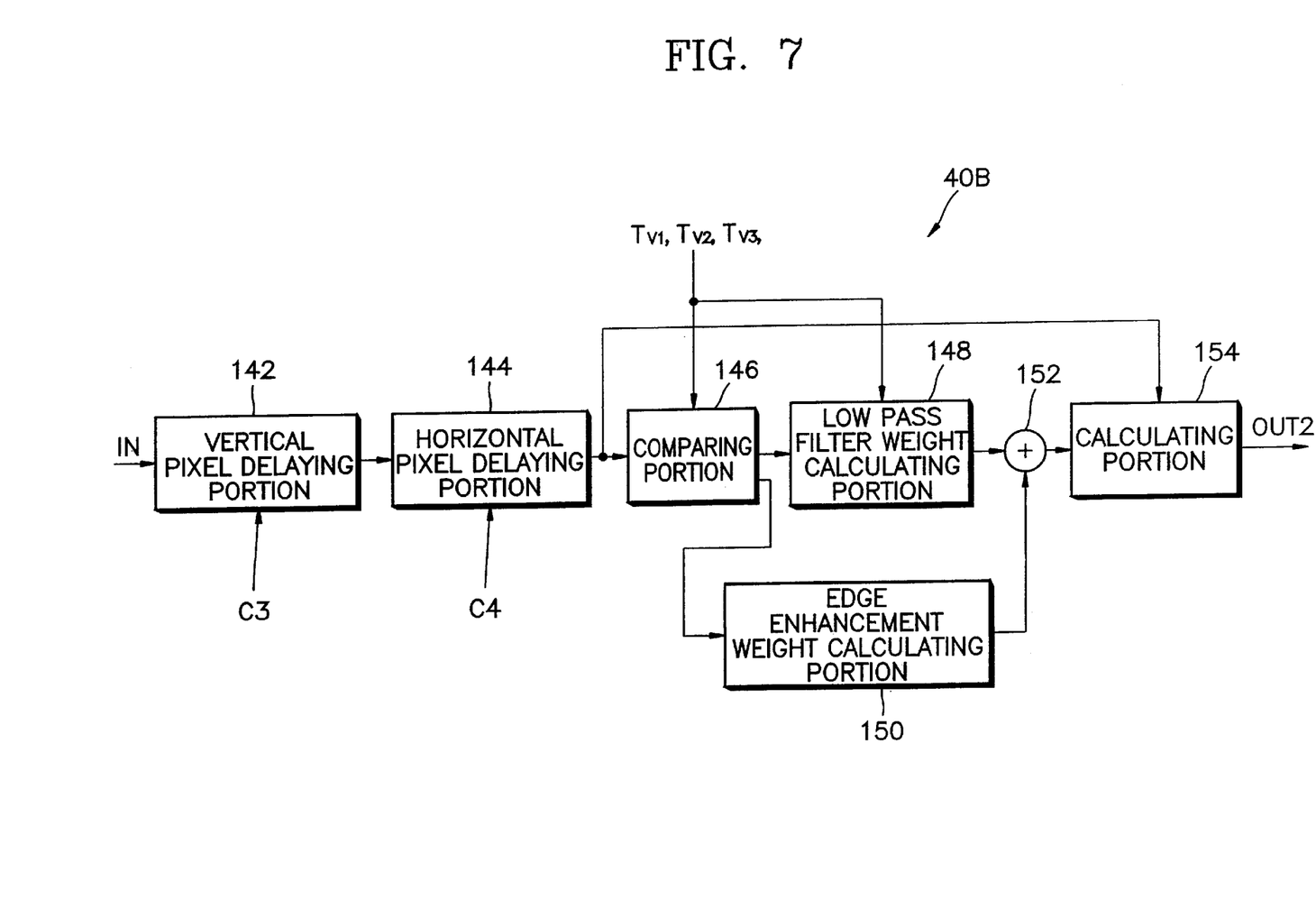
FIG. 7 is a block diagram of one embodiment of an adaptive band-pass filter according to the present invention.

FIG. 7 is a block diagram of one embodiment of an adaptive band-pass filter 40B according to the present invention, corresponding to the adaptive filtering portion 40 shown in FIG. 3. The adaptive band-pass filter 40B includes a vertical pixel delaying portion 142, a horizontal pixel delaying portion 144, a comparing portion 146, a low-pass filter weight calculating portion 148, an edge enhancement weight calculating portion 150, an adder 152, and a calculating portion 154.

Figure 8:
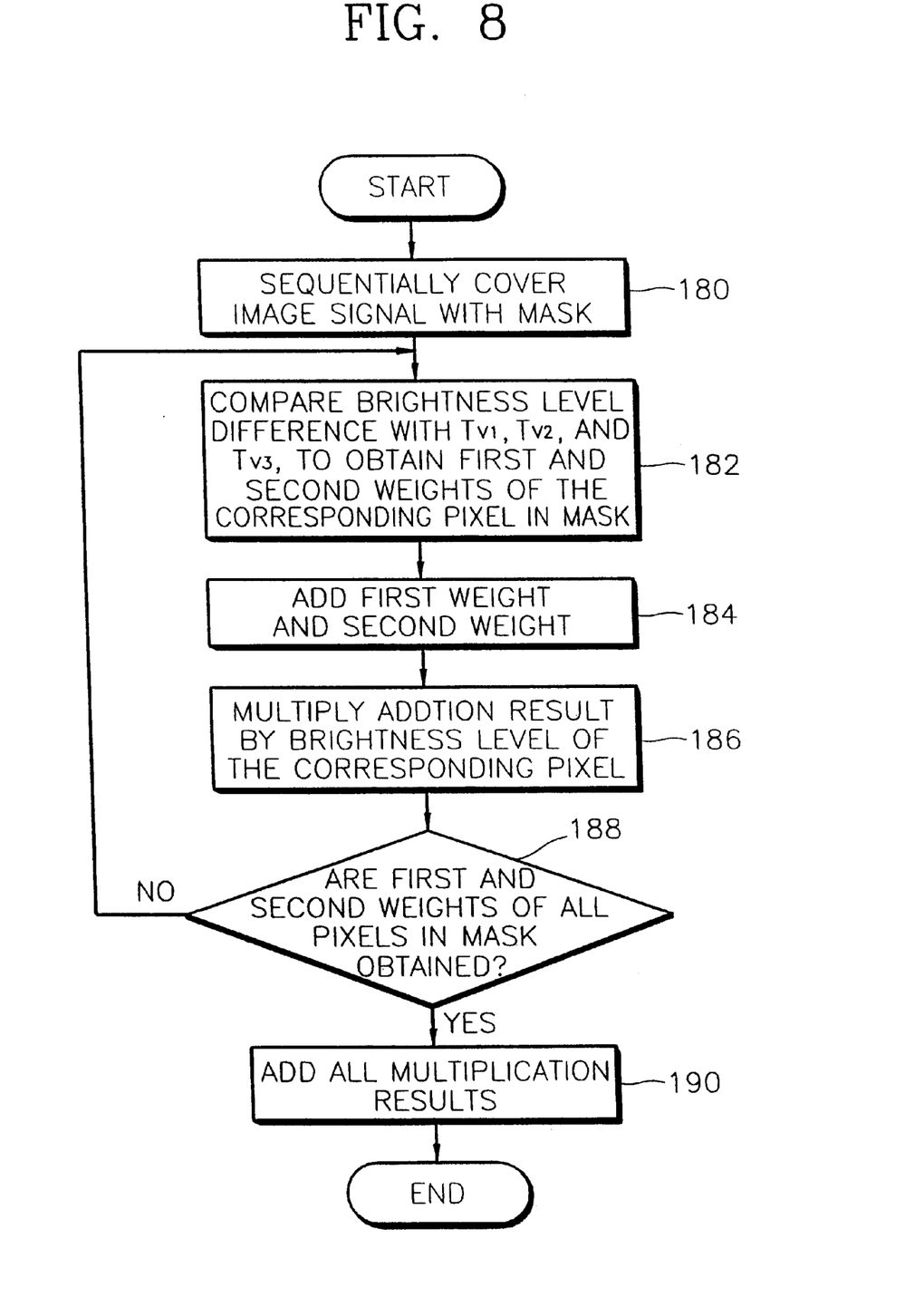
FIG. 8 is a flow chart describing one embodiment of a method for obtaining an image signal which can be adaptively filtered in the apparatus shown in FIG. 7 according to the present invention.

FIG. 8 is a flow chart describing one embodiment of a method for obtaining an image signal adaptively band-pass filtered in the apparatus shown in FIG. 7. The method includes the steps of obtaining first and second weights from the image signal (steps 180 and 182) and the steps of multiplying the brightness level of the pixel by the sum of the first weight and the second weight, accumulating the multiplied results for all the pixels, and obtaining the adaptively band-pass filtered image signal (steps 184 through 190).

The vertical pixel delaying portion 142, the horizontal pixel delaying portion 144, and the low-pass filter weight calculating portion 148 shown in FIG. 7 respectively perform the same functions as the vertical pixel delaying portion 102, the horizontal pixel delaying portion 104, and the low-pass filter weight calculating portion 108 shown in FIG. 5.

First, the image signal is sequentially covered with a mask (step 180). The vertical and horizontal pixel delaying portions 142 and 144 perform the step 180 in response to third and fourth control signals C3 and C4 output from controlling portion (not shown). After step 180, the brightness level difference between the central pixel located in the center of the mask and pixels adjacent to the central pixel is compared with the first threshold value TV1, the second threshold value TV2, and the third threshold value TV3. The first and second weights are obtained according to the comparison results (step 182).

The first weight can be obtained by the above-mentioned steps 122 through 128. For this, the comparing portion 146 shown in FIG. 7 calculates the brightness level difference between the central pixel and the adjacent pixels among the brightness levels of the pixels of the image signal output from the horizontal pixel delaying portion 146. The comparing portion 146 determines whether the calculated brightness level difference is less than or equal to the first threshold value TV1 which is variable and input from the outside. If the brightness level difference is larger than the first threshold value TV1, the low-pass filter weight calculating portion 148 determines the first weight to be zero. However, if the brightness level difference is less than or equal to the first threshold value TV1, the low-pass filter weight calculating portion 148 obtains the first weight $W_1(m,n)$ as shown in equation 1, corresponding to the brightness level difference output from the comparing portion 106 and the first threshold value TV1 input from the outside.

Figure 9:
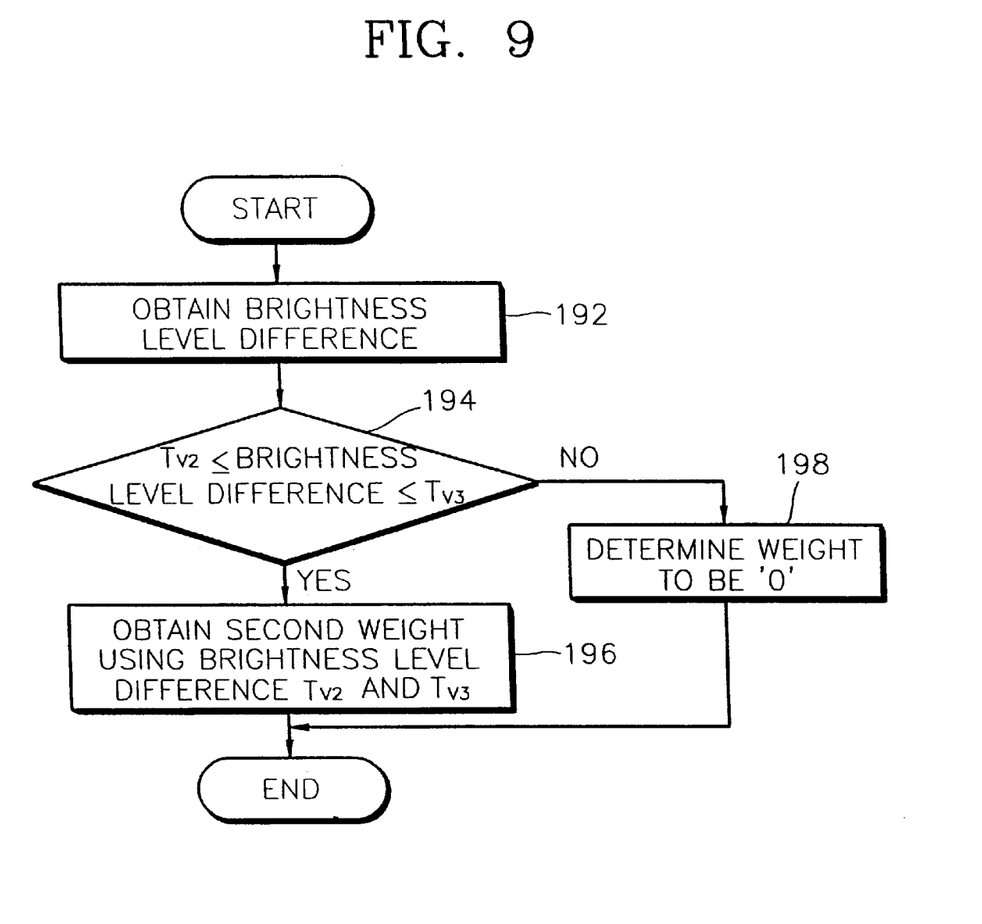
FIG. 9 is a flow chart describing one embodiment of a method for obtaining a second weight from step 182 of FIG. 8 according to the present invention.

FIG. 9 is a flow chart describing a method according to the present invention for obtaining the second weight in step 182 of FIG. 8. The method includes the steps of comparing the brightness level difference with the second and third threshold values TV2 and TV3 and obtaining the second weight according to the comparison results (steps 192 through 198).

The second weight is obtained according to the results obtained by comparing the brightness level difference with the second and third threshold values TV2 and TV3. The comparing portion 146 obtains the brightness level difference between the central pixel and the adjacent pixel (step 192) and determines whether the obtained brightness level difference is greater than or equal to the second threshold value TV2 and less than or equal to the third threshold value TV3 (step 194). In one embodiment, the second and third threshold values TV2 and TV3 input from the outside are variable and are not related to the first threshold value TV1.

The second weight is determined to be zero when the brightness level difference is 215 smaller than the second threshold value TV2 or larger than the third threshold value TV3 (step 198). However, when the brightness level difference is greater than or equal to the second threshold value TV2 and less than or equal to the third threshold value TV3, the edge enhancement weight calculating portion 150 calculates the second weight $W_2(m,n)$ of the pixel as shown in the following equation 2, corresponding to the brightness level difference output from the comparing portion 146 and the second and third threshold values TV2 and TV3 input from the outside.

$$W_2(m, n) = \frac{TV2 - |x(i, j) - x(i+k, j+1)|}{TV3 - TV2}; \quad (2)$$

$$\text{for } -\frac{M}{2} \le k \le \frac{M}{2} \text{ and } -\frac{N}{2} \le l \le \frac{N}{2}$$

The calculated result is output to the adder 152 (step 196). The order in which the first and second weights are obtained can be changed. The first and second weights can be simultaneously obtained.

After the step 182, the adder 152 adds together the first and second weights, respectively output from the low-pass filter weight calculating portion 148 and the edge enhancement weight calculating portion 150 (step 184). The calculating portion 152 multiplies the sum of the two weights by the brightness level of a concerned pixel output from the horizontal pixel delaying portion 144 (step 186).

After step 186, the controlling portion (not shown) determines whether the first and second weights for each of all the pixels in the mask have been obtained (step 188). When the weights of all the pixels in the mask are not obtained, the controlling portion (not shown) controls the vertical and horizontal pixel delaying portions 142 and 144 using the third and fourth control signals C3 and C4 to output the brightness levels of the remaining pixels to the comparing portion 146. Therefore, the comparing portion 146 calculates a new brightness level difference.

If the weights for all the pixels in the mask are obtained, the calculating portion 154 adds the multiplied values to each other and outputs the obtained result through an output terminal OUT as an adaptively band-pass filtered image signal (step 190).

Referring again to FIGS. 3 and 4, after step 50, the high-pass filter 42 filters the high-frequency component of the adaptively low-pass filtered or adaptively band-pass filtered image signal (step 52) obtained in step 50 as described above in detail in connection with FIGS. 5–9. In one embodiment the high-pass filter 42 has a transfer function expressed by a matrix of size K×L (rows×columns). The central coefficient value of the transfer function is KL−1, and the remaining coefficient values are −1. When L is 1, the high-pass filter 42 has a one-dimensional transfer function such as the following determinant.

$$|\ldots -1 \; K-1 \; -1 \ldots| \quad (3)$$

However, when L is not 1, the high-pass filter 42 has a two-dimensional transfer function such as the following determinant.

$$\begin{vmatrix} \cdots & \cdots & \cdots & \cdots & \cdots \\ \cdots & -1 & -1 & -1 & \cdots \\ \cdots & -1 & KL-1 & -1 & \cdots \\ \cdots & -1 & -1 & -1 & \cdots \\ \cdots & \cdots & \cdots & \cdots & \cdots \end{vmatrix} \quad (4)$$

After step 52, the absolute value calculating portion 44 shown in FIG. 3 calculates the absolute value of the image signal in which the high-frequency component is filtered and outputs the calculated absolute value to the accumulating portion 46 (step 54). After step 54, the accumulating portion 46 accumulates absolute values obtained with respect to the entire image and outputs the accumulated value through the output terminal OUT, as the focus value (step 56).

The controlling portion (not shown) controls the focus of a lens using the focus value output from the accumulating portion 46. For example, the controlling portion selects the largest focus value among the focus values output from the accumulating portion 46. It determines the position of the lens when the image signal corresponding to the selected focus value is input to be the position of the lens having the best adjusted focus.

Figure 10:
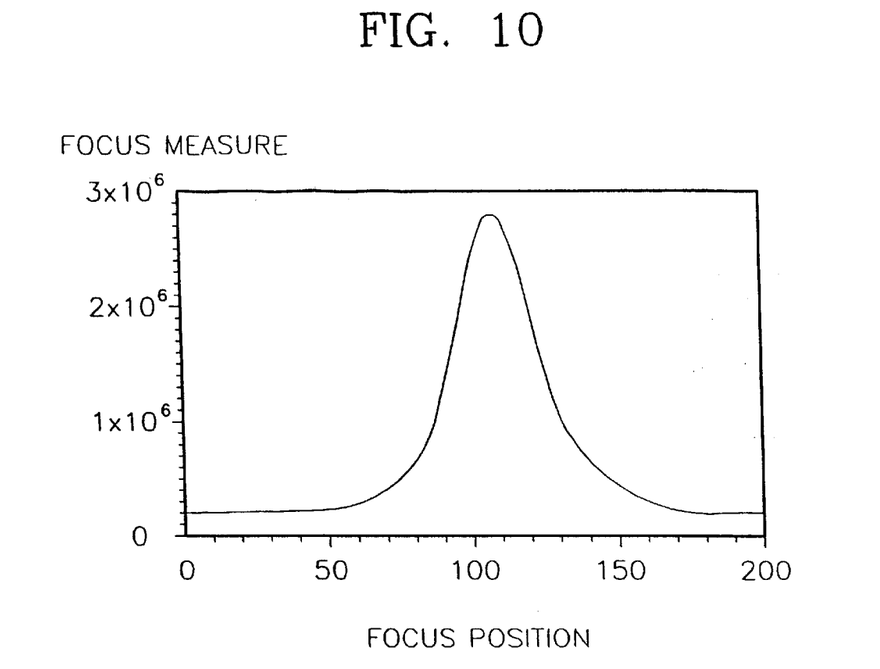
FIG. 10 is a graph showing a focus curve obtained using an adaptive low-pass filter according to the present invention.
Figure 11:
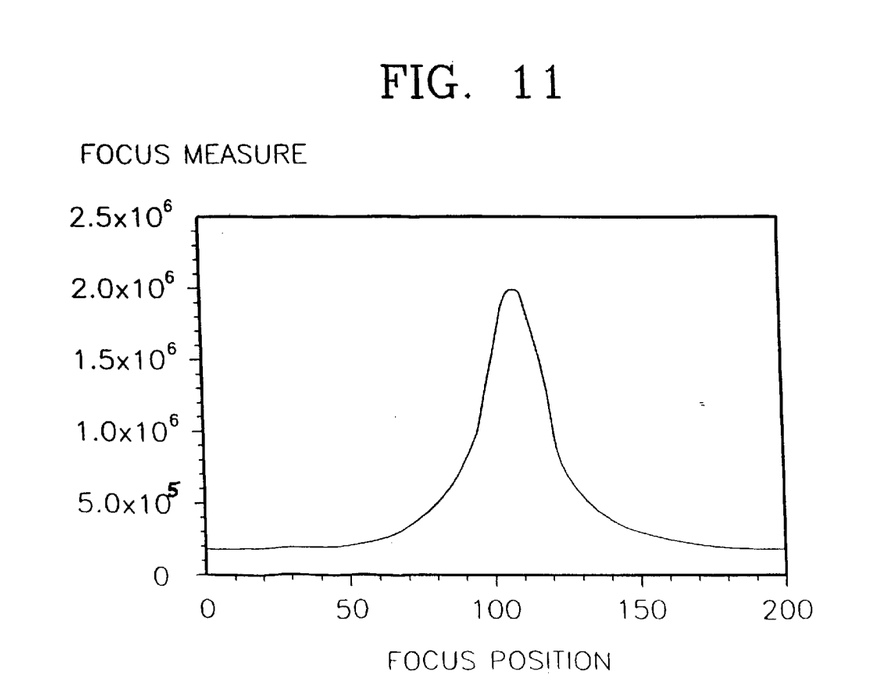
FIG. 11 is a graph showing a focus curve obtained using an adaptive band-pass filter according to the present invention.

FIG. 10 shows a focus curve obtained using the adaptive low-pass filter of the invention, and FIG. 10 shows a focus curve obtained using the adaptive band-pass filter of the invention. As shown in FIGS. 10 and 11, in the apparatus and method according to the present invention, the focus curve has a slope in the entire area of an image, that is, the whole range of the focus position. It has its steepest slope at the focus position of maximum focus measure. In the curves shown in FIGS. 10 and 11, no local maximum focus measures exist. Therefore, the effects of high-frequency noise components in the image are virtually eliminated.

As described above, in the focus control apparatus and method using an adaptive filter according to the present invention, errors due to noise are reduced by removing the high-frequency noise in the low-frequency area of the image using the adaptive filter. Also, necessary high-frequency components such as edges are preserved and enhanced by the edge enhancer. Therefore, a more precise focus value is obtained.

While this invention has been particularly shown and described with references to preferred embodiments thereof, it will be understood by those skilled in the art that various changes in form and details may be made therein without departing from the spirit and scope of the invention as defined in the following claims.

What is claimed is:

1. A focus control apparatus using an adaptive filter for determining a focus value used for controlling the focus of a lens, comprising:

adaptive low-pass filtering means for applying a mask of a predetermined size to an image signal captured through the lens, said adaptive low-pass filtering means comparing brightness level differences between a central pixel located in the center of the mask and pixels adjacent to the central pixel with a threshold value, multiplying a weight calculated in response to the result of comparing the brightness level differences by a brightness level of a concerned pixel in the mask, adding together the multiplication results of all the pixels, and outputting an addition result as an adaptively low-pass filtered image signal;

a high-pass filter for filtering a high-frequency component of the adaptively low-pass filtered image signal;

absolute value calculating means for calculating absolute values of the image signal in which the high-frequency component is filtered; and accumulating means for accumulating the absolute values and outputting an accumulated value as the focus value of the captured image signal.

2. The apparatus of claim 1, wherein the adaptive low-pass filtering means comprises:

vertical pixel delaying means for vertically delaying the image signal captured through the lens and outputting a vertically delayed image signal;

horizontal pixel delaying means for horizontally delaying the output of the vertical pixel delaying means and outputting a horizontally delayed signal;

comparing means for calculating the brightness level differences between the central pixel and the adjacent pixels among the pixels output from the horizontal pixel delaying means, comparing the output brightness level differences with the threshold value, and outputting the comparison result and the brightness level differences;

low-pass filter weight calculating means for calculating the weight of the concerned pixel in response to the comparison result, using the brightness level differences and the threshold value; and calculating means for multiplying the weight by the brightness level of the concerned pixel output from the horizontal pixel delaying means, adding together the results of said multiplying for all pixels, and outputting the result of said adding as the adaptively low-pass filtered image signal.

3. The apparatus of claim 2, wherein the vertical pixel delaying means comprises a line memory.

4. The apparatus of claim 1, wherein the high-pass filter has a transfer function having a size of K×L (rows× columns), a central coefficient value of the transfer function is KL−1 and the remaining coefficient values are −1.

5. A focus control apparatus using an adaptive filter for determining a focus value used for controlling the focus of a lens, comprising:

adaptive band-pass filtering means for applying a mask of a predetermined size to an image signal captured through the lens, said adaptive band-pass filtering means comparing brightness level differences between a central pixel located in the center of the mask and pixels adjacent to the central pixel with first, second, and third threshold values, multiplying the sum of first and second weights calculated in response to the results of comparing the brightness level differences by a brightness level of a concerned pixel in the mask, adding the multiplication results for all the pixels, and outputting an addition result as an adaptively band-pass filtered image signal;

a high-pass filter for filtering the high-frequency component of the adaptively band-pass filtered image signal;

absolute value calculating means for calculating absolute values of the image signal in which the high-frequency component is filtered; and accumulating means for accumulating the absolute values and outputting an accumulated value as the focus value of the captured image signal.

6. The apparatus of claim 5, wherein the adaptive band-pass filtering means comprises:

vertical pixel delaying means for vertically delaying the image signal captured through the lens and outputting a vertically delayed image signal;

horizontal pixel delaying means for horizontally delaying the output of the vertical pixel delaying means and outputting a horizontally delayed signal;

comparing means for calculating the brightness level differences between the central pixel and the adjacent pixels among the pixels output from the horizontal pixel delaying means, comparing the calculated brightness level differences with the first threshold value to output a first comparison result, and comparing the brightness level differences with the second and third threshold values to output a second comparison result;

low-pass filter weight calculating means for calculating the first weight of the concerned pixel in response to the first comparison result, using the brightness level differences and the first threshold value;

aperature weight calculating means for calculating the second weight of the concerned pixel in response to the second comparison result, using the brightness level differences and the second and third threshold values;

adding means for adding the first weight to the second weight; and calculating means for multiplying the result of said adding by the brightness level for the concerned pixel output from the horizontal pixel delaying means, adding the multiplication values for all pixels to output the adaptively band-pass filtered image signal.

7. The apparatus of claim 6, wherein the vertical pixel delaying means comprises a line memory.

8. The apparatus of claim 5, wherein the high-pass filter has a tranfer function having a size of K×L (rows×columns), a central coefficient value of the transfer function is KL−1 and the remaining coefficient values are −1.

9. A focus control method using an adaptive filter for determining a focus value used for controlling the focus of a lens, comprising the steps of:

(a) obtaining an adaptively low-pass filtered image signal by sequentially applying a mask of a predetermined size to an image signal captured through the lens, said obtaining comprising:

comparing brightness level differences between a central pixel located in the center of the mask and pixels adjacent to the central pixel with a threshold value, multiplying a weight calculated corresponding to the result of said comparing by a brightness level of a concerned pixel in the mask, and adding the results of said multiplying for all pixels;

(b) filtering the high-frequency component of the adaptively low-pass filtered image signal;

(c) obtaining the absolute values of the image signal in which the high-frequency component is filtered; and (d) determining the focus value of the captured image signal by accumulating absolute values.

10. The method of claim 9, wherein step (a) comprises the steps of:

(a1) sequentially covering the captured image signal with the mask of the predetermined size;

(a2) obtaining the brightness level difference between the central pixel and the adjacent pixels;

(a3) determining whether the brightness level difference is less than or equal to the threshold value;

(a4) determining the weight to be zero when the brightness level difference is larger than the threshold value;

(a5) determining the weight using the threshold value and the brightness level difference when the brightness level difference is less than or equal to the threshold value;

(a6) multiplying the weight by the brightness level of the concerned pixel;

(a7) determining whether the weights of all the pixels in the mask have been obtained and repeating steps (a2) through (a6) when all the weights have not been obtained; and (a8) obtaining the adaptively low-pass filtered image signal by accumulating the multiplication results of step (a6) when all the weights have been obtained.

11. A focus controlling method using an adaptive filter for determining a focus value used for controlling the focus of a lens, comprising the steps of:

(a) sequentially applying a mask of a predetermined size to an image signal captured through the lens, comparing brightness level differences between a central pixel located in the center of the mask and pixels adjacent to the central pixel with first, second, and third threshold values, multiplying the sum of first and second weights calculated according to the comparison results by a brightness level of the concerned pixel, obtaining an adaptively band-pass filtered image signal by accumulating the multiplication results;

(b) filtering the high-frequency component of the adaptively band-pass filtered image signal;

(c) obtaining the absolute values of the image signal in which the high-frequency component is filtered; and (d) determining the focus value of the captured image signal by accumulating the absolute values.

12. The method of claim 10, wherein step (a) comprises the steps of:

(a1) sequentially covering the captured image signal with the mask of the predetermined size;

(a2) comparing the brightness level difference with the first threshold value to obtain the first weight corresponding to the comparison result;

(a3) comparing the brightness level difference with the second and third threshold values to obtain the second weight corresponding to the comparison result of step (a2);

(a4) adding the first weight to the second weight;

(a5) multiplying the addition result of step (a4) by the brightness level of the concerned pixel;

(a6) determining whether the first and second weights of all the pixels in the mask have been obtained, and repeating steps (a2) through (a5) when all the weights have not been obtained; and (a7) obtaining the adaptively band-pass filtered video signal by accumulating the multiplication results of step (a5) when all the weights have been obtained.

13. The method of claim 12, wherein step (a2) comprises the steps of:

(a21) obtaining brightness level difference between the central pixel and the adjacent pixel;

(a22) determining whether the brightness level difference is less than or equal to the first threshold value;

(a23) determining the first weight to be zero when the brightness level difference is greater than the first threshold value; and (a24) determining the first weight using the first threshold value and the brightness level difference when the brightness level difference is less than or equal to the first threshold value.

14. The method of claim 13, wherein step (a3) comprises the steps of:

(a31) obtaining brightness level difference between the central pixel and the adjacent pixel;

(a32) determining whether the brightness level difference is greater than or equal to the second threshold value and less than or equal to the third threshold value;

(a33) determining the second weight to be zero when the brightness level difference is less than the second threshold value or greater than the third threshold value; and (a34) calculating the second weight using the brightness level difference and the second and third threshold values when the brightness level difference is greater than or equal to than the second threshold value and less than or equal to the third threshold value.

* * * * *

UNITED STATES PATENT AND TRADEMARK OFFICE
CERTIFICATE OF CORRECTION

PATENT NO.      : 6,545,715 B1                                   Page 1 of 1
DATED           : April 8, 2003
INVENTOR(S)     : Woon Na It is certified that error appears in the above-identified patent and that said Letters Patent is hereby corrected as shown below:

Column 11,
Line 30, delete "10" and replace it with -- 11 --.

Signed and Sealed this

Third Day of August, 2004

JON W. DUDAS
*Acting Director of the United States Patent and Trademark Office*